Figure 1:
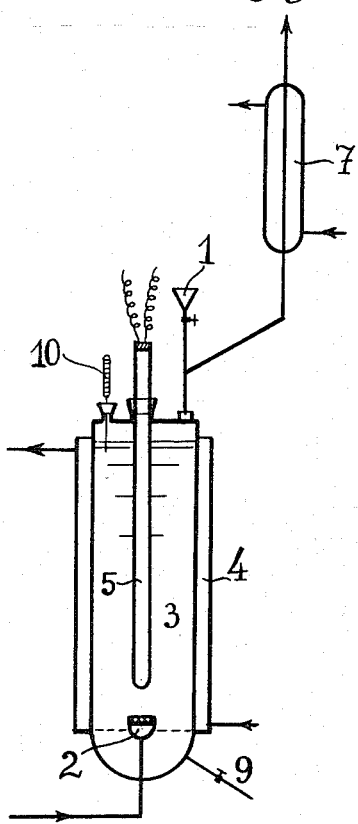

Dec. 23, 1958 A. JACOBOWSKY ET AL 2,865,825
PROCESS FOR PREPARING SYMMETRICAL TETRACHLORETHANE
FROM SYMMETRICAL DICHLORETHYLENE
Filed June 3, 1954 2 Sheets-Sheet 1

Armin Jacobowsky
Kurt Sennewald
INVENTORS

BY *Connelly and Hutz*
*their* ATTORNEYS

United States Patent Office 2,865,825
Patented Dec. 23, 1958

2,865,825

PROCESS FOR PREPARING SYMMETRICAL TETRACHLORETHANE FROM SYMMETRICAL DICHLORETHYLENE

Armin Jacobowsky and Kurt Sennewald, Knapsack, near Koln, Germany, assignors to Knapsack-Griesheim Aktiengesellschaft, Knapsack, Bezirk Koln, Germany, a German company Application June 3, 1954, Serial No. 434,222

Claims priority, application Germany June 11, 1953

7 Claims. (Cl. 204—163)

The present invention relates to a process for preparing symmetrical tetrachlorethane from symmetrical dichlorethylene.

It is known that symmetrical dichlorethylene can be chlorinated to symmetrical tetrachlorethane in the vapor phase at 80° C.–100° C. with exposure to light of a wave length of 4358–4360 Angstrom units by submitting it to the action of elementary chlorine.

Another known process is conducted in the liquid phase without ultraviolet light while using benzoyl peroxide as a catalyst and carrying out the chlorination with $SO_2Cl_2$. The yield, however, amounts only to 85 percent.

The above processes are substantially set forth in "Zeitschrift für Physikalische Chemie," Part B, volume 35, pages 285–297 by Mueller and Schumacher and "Zeitschrift für Elektrochemie," volume 43, 1937, pages 807–808 by Mueller and Schumacher.

Now we have found that 1.2-dichlorethylene can be converted continuously or discontinuously in the liquid phase in a smooth reaction into symmetrical tetrachlorethane in a yield of 99 percent by causing chlorine to react with liquid symmetrical dichlorethylene, which has been preheated to 20° C.–120° C., preferably to 45° C.–60° C., with exposure to ultraviolet light, preferably that of a mercury vapor lamp. The photocatalytic reaction according to the invention may be carried out in the presence, preferably however, in the absence, of a catalyst under normal or superatmospheric pressure, the lower limit of the superatmospheric pressure to be applied at higher temperatures being given by the vapor pressure.

The reaction is advantageously carried out as follows: Symmetrical dichlorethylene and chlorine are continuously conducted in the same direction, or preferably in counter-current to each other, through a column-like reaction vessel of an annular cross-section. Inside the reaction vessel a light source is mounted which may, for example, be a mercury vapor lamp. The symmetrical tetrachlorethane thus obtained in a quantitative yield is also drawn off continuously. The reaction may, however, be carried out in any other apparatus in which a gas can be finely dispersed in a liquid, for example, in a vessel equipped with a stirrer, in a turbomixer, in an injector or the like. It is of advantage to disperse the chlorine as finely as possible. When chlorine which is not finely dispersed is introduced the reaction also takes place but the chlorine which has been introduced is not taken up completely if the height of the dichlorethylene layer is only small. If, however, the column is of a sufficient height, i. e. if the chlorine remains for a sufficiently long time in the dichlorethylene, the chlorine is taken up completely without being finely dispersed. The simplest way is to pass the chlorine in the form of small bubbles through liquid symmetrical dichlorethylene.

The chlorination is carried out at temperatures of 20° C.–120° C. The preferred reaction temperature is 45° C.–60° C. due to the boiling point of the 1.2-trans-dichlorethylene (48° C.) and that of the 1.2-cis-dichlorethylene (60° C.). At temperatures below 45° C. the reaction takes a slower course. This difficulty is avoided at higher temperatures (45° C. to 120° C.). At temperatures above 60° C. the process has to be carried out under pressure, increased formation of hexachlorethane or hexachlorobutane, however, taking place.

As starting material cis- or trans-dichlorethylene or mixtures thereof may be used. The setting in of the reaction can be ascertained by the fact that the dichlorethylene remains colourless on the introduction of chlorine. When for example, at a low temperature only an incomplete reaction takes place, the chlorine dissolves in the dichlorethylene with a yellow coloration.

The termination of the reaction can be ascertained by means of an analysis by fractional distillation. Since a smooth and complete reaction takes place it is, however, sufficient, when proceeding discontinuously, to introduce the stoichiometrically calculated amount of chlorine into the dichlorethylene, or, when proceeding continuously, to introduced into the apparatus dichlorethylene and chlorine in a stoichiometric proportion.

Non-reacted dichlorethylene is present in the reaction product only if the apparatus is operated above capacity or if the supply of chlorine is insufficient. If this occurs, tetrachlorethane and dichlorethylene are separated from one another by distillation. After the distillation any non-reacted dichlorethylene is returned to the chlorinating apparatus and reacted once more.

When, however, the temperature and the quantities of chlorine and dichlorethylene are properly controlled the dichlorethylene is converted completely into tetrachlorethane.

Compared with working in the gaseous phase, operating in the liquid phase offers essential advantages. As is known, the reaction heat can be better eliminated from the liquid than from the gaseous phase. Since there are no gas chambers any risk of explosion is avoided. Furthermore, for working in the liquid phase an essentially smaller apparatus is needed so that with a reaction vessel of the same size the capacity of apparatus is considerably higher than when working in the gaseous phase. Finally, the energy required for evaporating the symmetrical dichlorethylene can be saved.

The following methods of operation are described hereafter, without, however, limiting the application thereto; they are illustrated, by way of example, in the accompanying diagrammatic drawings which each represent apparatus for carrying out a particular method of operation.

Example 1

Into a column-like reaction vessel 3 (see Fig. 1) which is equipped with a mercury vapor lamp 5, a thermometer 10 and a water jacket 4 and which has a capacity of 1.5 liters, 1000 ml.=1257 grams of symmetrical dichlorethylene are introduced through funnel 1. After putting the lamp into operation, 150 normal liters of chlorine are introduced per hour at 45° C. while cooling, from below by way of frit 2, normal liter meaning the volume of the gas at 0° C. and under a pressure of 760 millimeters of mercury. After about 2 hours the chlorination is terminated. The symmetrical tetrachlorethane which has been obtained from the symmetrical dichlorethylene is drawn off at 9. Reflux condenser 7 serves to condense any evaporating symmetrical dichlorethylene.

1350 ml.=2160 grams of symmetrical tetrachlorethane are obtained. A complete chlorination is effected, 99.5 percent of the product is symmetrical tetrachlorethane and 0.5 percent is hexachlorethane. The yield per unit of volume and time, i. e. the capacity of the apparatus per liter of reaction chamber and per hour amounts to 1.08 kilograms of symmetrical tetrachlorethane.

Example 2

Figure 2:
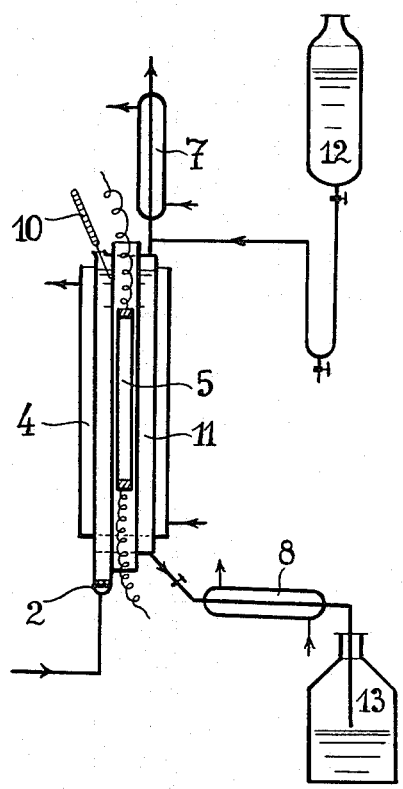

A column-like reaction vessel 11 (see Fig. 2) which has an annular cross-section and a capacity of 1000 ml. is equipped on the outside with a cooling jacket 4 and within with a mercury vapor lamp 5 placed in a quartz tube which is open at either end. 600 grams per hour =755 ml. of 1.2-transdichlorethylene are continuously introduced at 45° C. entering from above from the supply vessel 12, and 175 normal liters per hour of chlorine are introduced from below through frit 2.

807 ml. per hour=1290 grams of 1.1.2.2-tetrachlorethane are obtained which are continuously drawn off by way of after-cooler 8 and then collected in the supply vessel 13. Any evaporating symmetrical dichlorethylene is condensed in the reflux condenser 7. The reaction temperature is controlled with the aid of thermometer 10. The consumption amounts to about 100 percent and the yield, calculated upon the dichlorethylene, amounts to 99 percent. The yield per hour and liter amounts to 1.3 kilograms of 1.1.2.2-tetrachlorethane.

Example 3

Figure 3:
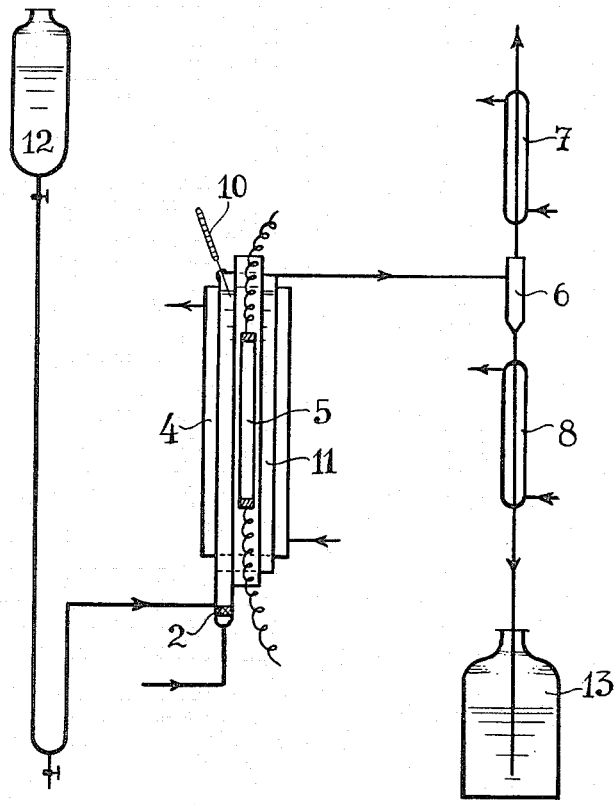

Into a column 11 (see Fig. 3) which has an annular cross-section and a capacity of 1000 ml. and which is equipped on the outside with a cooling jacket 4 and within with a high pressure mercury vapor lamp 5 placed in a quartz tube, which is open at either end, 1000 ml. of symmetrical tetrachlorethane are introduced.

Into the symmetrical tetrachlorethane there are continuously introduced at 45–50° C., 920 ml. per hour =1160 grams of symmetrical dichlorethylene entering from below from the supply vessel 12 and 270 liters per hour of chlorine entering through frit 2, both flowing in the same direction. The tetrachlorethane so obtained (1250 ml.=2000 grams per hour) flows over continuously at the top part of the reaction vessel 11. It passes through separator 6 and cooler 8 and enters the supply vessel 13. The apparatus is de-aerated by way of cooler 7. Thermometer 10 serves to register the reaction temperature. When the dichlorethylene and the chlorine are charged in exact proportions a complete reaction of 100 percent conversion can be attained.

The yield calculated upon symmetrical dichlorethylene, amounts to 99.5 percent.

The yield per unit of volume and time, i. e. the capacity of the apparatus per hour and per liter of reaction chamber, is 2.0 kilograms of symmetrical tetrachlorethane. 99.6 percent of the product obtained is symmetrical tetrachlorethane and 0.4 percent is hexachlorethane.

We claim:

1. A process for preparing 1,1,2,2-tetrachlorethane which comprises reacting liquid 1,2-dichlorethylene with chlorine in the presence of ultra-violet light while maintaining the temperature at between about 45° C. and 120° C., and maintaining the pressure sufficient to keep the 1,2-dichlorethylene in the liquid state.

2. The process of claim 1 wherein the 1,2-dichlorethylene and the chlorine are present in substantially stoichiometric proportions and the reaction temperature is held between 45° C. and 60° C.

3. The process of claim 1 wherein the chlorine is finely dispersed.

4. The process of claim 1 wherein the reaction is a continuous operation.

5. The process of claim 1 wherein the reaction is a discontinuous operation.

6. The process of claim 1 wherein the chlorine is continuously passed in counter-current to the 1,2-dichloroethylene during the reaction.

7. The process of claim 1 wherein the chlorine is continuously passed through the reaction area in the same direction as the 1,2-dichloroethylene during the reaction.

References Cited in the file of this patent

UNITED STATES PATENTS

| 2,174,737 | Coleman et al. | Oct. 3, 1939 |
| 2,473,162 | McBee et al. | June 14, 1949 |

FOREIGN PATENTS

| 530,649 | Germany | July 31, 1931 |

OTHER REFERENCES

Mueller et al.: Zeitschrift für Elektrochemie, vol. 43 (1937), pp. 807–808.